(12) United States Patent
Nylund (10) Patent No.: US 11,021,010 B2
(45) Date of Patent: Jun. 1, 2021

(54) SHIELDING ASSEMBLY FOR SIDE OF TIRE

(71) Applicant: Argonics, Inc., Gwinn, MI (US)

(72) Inventor: Jeremy Nylund, Marquette, MI (US)

(73) Assignee: Argonics, Inc., Gwinn, MI (US)

( * ) Notice: Subject to any disclaimer, the term of this patent is extended or adjusted under 35 U.S.C. 154(b) by 358 days.

(21) Appl. No.: 16/006,334

(22) Filed: Jun. 12, 2018

(65) Prior Publication Data

US 2018/0354295 A1    Dec. 13, 2018

Related U.S. Application Data

(60) Provisional application No. 62/518,356, filed on Jun. 12, 2017.

(51) Int. Cl.
| | | |
|---|---|---|
| *B60B 7/01* | (2006.01) | |
| *B60B 7/04* | (2006.01) | |
| *B60B 7/14* | (2006.01) | |

(52) U.S. Cl.
CPC ............... *B60B 7/01* (2013.01); *B60B 7/04* (2013.01); *B60B 7/14* (2013.01); *B60B 2360/324* (2013.01); *B60B 2900/212* (2013.01)

(58) Field of Classification Search
CPC .... B60B 7/01; B60B 7/04; B60B 7/06; B60B 7/063; B60B 7/14
See application file for complete search history.

(56) References Cited

U.S. PATENT DOCUMENTS

| | | | |
|---|---|---|---|
| 1,321,992 A | * | 11/1919 | Disselkoen ............. B60B 11/10 |
| | | | 301/40.3 |
| 1,905,674 A | | 4/1933 | Babbs |
| 4,235,271 A | | 11/1980 | Olsen et al. |
| 4,252,169 A | | 2/1981 | Watts |
| 5,531,508 A | | 7/1996 | Bell, III |
| 8,876,222 B2 | | 11/2014 | Seradarian et al. |
| 2010/0066155 A1 | | 3/2010 | Seradarian et al. |
| 2015/0298499 A1 | | 10/2015 | Renson et al. |
| 2015/0328924 A1 | | 11/2015 | Renson |
| 2016/0068032 A1 | | 3/2016 | Kritzell et al. |

FOREIGN PATENT DOCUMENTS

| | | |
|---|---|---|
| EP | 0007981 | 2/1980 |
| WO | 2008092185 | 8/2008 |
| WO | 2015035007 | 3/2015 |

* cited by examiner

*Primary Examiner* — Jason R Bellinger
(74) *Attorney, Agent, or Firm* — Wood, Phillips, Katz, Clark & Mortimer (57) ABSTRACT

A shielding structure for a wheel having a turning axis, a rim, and a tire mounted to the rim for rolling against an underlying surface. The wheel has axially oppositely facing sides. A mounting assembly is attached to the rim to move as one piece therewith. A plurality of shielding components are attached to the mounting assembly to overlie at least a part of the tire at one of the axially oppositely facing sides of the wheel. At least one of the shielding components is made from a non-metal material and a reinforcing element.

21 Claims, 7 Drawing Sheets

SHIELDING ASSEMBLY FOR SIDE OF TIRE

BACKGROUND OF THE INVENTION

Field of the Invention

This invention relates to wheels with a rim mounted tire and, more particularly, to structure for shielding a side of the tire against puncture and wear from encountered environmental materials and objects.

Background Art

Rim mounted rubber tires are used on a wide range of vehicles. One particularly vulnerable part of these tires is the exposed sidewall region. While the main tread region may be made with a highly durable construction, the tire sidewalls are more prone to being compromised by being punctured, worn, etc. Damage to a tire sidewall may render the tire unusable and irreparable.

The above problem is not significant for vehicles designed for highway driving. However, this problem is common and costly in industries where vehicles are required to navigate rugged terrain and/or are likely to encounter sharp objects that may penetrate the tire sidewall.

Even if a sharp object is not encountered that effects penetration of puncture of a tire sidewall, progressive wear of the tire sidewall, as when regularly immersed in abrasive material, may necessitate tire replacement before its intended useful life period expires.

A number of systems have been devised to overlie part or all of a tire sidewall to minimize abrasive wear and the likelihood of penetration of the sidewall by a foreign object, such as a protruding rock and/or other hard environmental debris.

Designers of these systems have a number of objectives. First of all, the systems must be effective in terms of greatly reducing the incidence of unusual wear or failure due to a puncturing of the sidewall region of tires operating in the particular severe environment.

Second, the systems must be user friendly in the sense that they can be initially mounted and potentially repaired conveniently on site.

Third, the systems must be affordable to justify their purchase and ongoing maintenance.

Fourth, the systems must utilize materials that function effectively in many different environments which may differ in terms of the nature of the terrain and foreign objects that may be encountered in use and climate conditions. In the latter case, it must be taken into account that a piece of equipment might be utilized in tropical climates year round whereas in other locales it may be exposed to frigid conditions for a good portion of the operating life of the equipment. Temperature extremes may make certain shielding compositions either more penetrable in hot climates or more brittle in extremely cold climates.

The industry continues to be challenged to make a practical system that addresses some or all of the above objectives which, at times, are in competition with each other.

SUMMARY OF THE INVENTION

In one form, the invention is directed to the combination of a wheel and a plurality of shielding components. The wheel has a turning axis and a rim. A tire is mounted to the rim for rolling against an underlying surface. The wheel has axially oppositely facing sides. A mounting assembly is attached to the rim to move as one piece therewith. The plurality of shielding components are attached to the mounting assembly to overlie at least a part of the tire at one of the axially oppositely facing sides of the wheel. At least one of the shielding components is made from a non-metal material and a reinforcing element. First and second fasteners each connect the reinforcing element on the at least one shielding component to the mounting assembly at spaced locations.

In one form, the at least one shielding component is made from urethane.

In one form, the reinforcing element is embedded in the urethane making up the at least one shielding component.

In one form, the at least one shielding component, viewed along the turning axis, is shaped as a truncated sector of a circle with radially inner and outer edge portions.

In one form, the reinforcing element extends over a majority of an extent of the inner edge portion of the at least one shielding component.

In one form, the first and second fastener each extends through the reinforcing element on the at least one shielding component and into the mounting assembly.

In one form, the plurality of shielding components include first and second shielding components respectively with circumferentially oppositely facing first and second edges. A receptacle is formed at the first edge into which a part of the second shielding component at the second edge projects with the first and second shielding components operatively connected to each other.

In one form, the part of the second shielding component at the second edge is an elongate rib with a radially extending length.

In one form, the receptacle at the first edge is bounded by axially oppositely facing surfaces.

In one form, the at least one shielding component has an axially facing surface that abuts to an axially facing surface on the tire.

In one form, the first and second fasteners are threaded fasteners directed into threaded bores in the mounting assembly.

In one form, the mounting assembly has an annular ring with a plurality of axially projecting mounting tabs through which the annular ring is connected to the rim.

In one form, the invention is directed to the combination of a wheel, a shielding assembly, and a fastening system for maintaining the shielding assembly in an operative state upon the wheel. The wheel has a turning axis, a rim, and a tire mounted to the rim for rolling against an underlying surface. The wheel has axially oppositely facing sides. The shielding assembly is attached to the wheel to overlie at least a part of the tire at one of the axially oppositely facing sides of the wheel. The shielding assembly is made up of a urethane material.

In one form, the shielding assembly has at least one reinforcing element embedded in the urethane material.

In one form, the fastening system includes a plurality of threaded fasteners extending through the at least one reinforcing element.

In one form, the shielding assembly has a plurality of shielding components including first and second shielding components respectively with circumferentially oppositely facing first and second edges. A receptacle is formed at the first edge into which a part of the second shielding component at the second edge projects with the first and second shielding components operatively connected to each other.

In one form, the part of the second shielding component at the second edge is an elongate rib with a radially extending length.

In one form, the receptacle at the first edge is bounded by axially oppositely facing surfaces.

In one form, the invention is directed to the combination of a wheel and a shielding assembly. The wheel has a turning axis, a rim, and a tire mounted to the rim for rolling against an underlying surface. The wheel has axially oppositely facing sides. The shielding assembly is attached to the wheel to overlie at least a part of the tire at one of the axially oppositely facing sides of the wheel. The shielding assembly has first and second shielding components respectively with circumferentially oppositely facing first and second edges. A receptacle is formed at the first edge into which a part of the second shielding component at the second edge projects with the first and second shielding components operatively connected to each other.

In one form, the invention is directed to a shielding assembly as described above.

DETAILED DESCRIPTION OF THE PREFERRED EMBODIMENT

Figure 1:
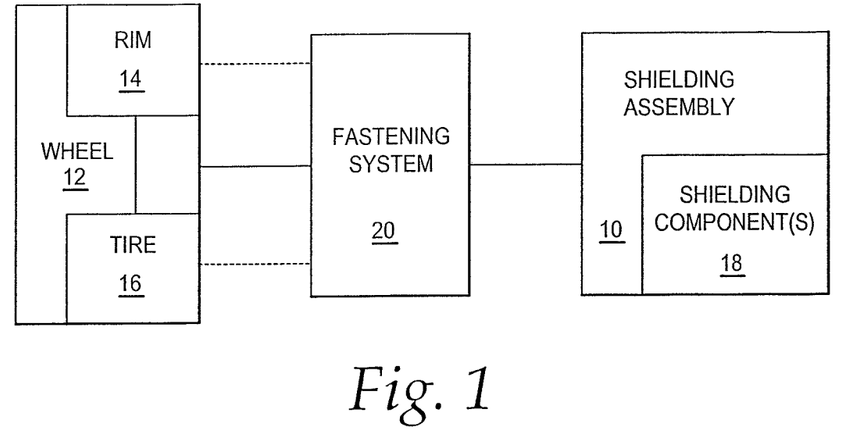
FIG. 1 is a schematic representation of a shielding assembly, according to the invention, operatively connected to a conventional wheel consisting of a tire mounted on a rim.

In FIG. 1, a shielding assembly, according to the present invention, is shown at 10 for use on a wheel 12 of the type having a rim 14 and a tire 16 mounted on the rim 14.

The shielding assembly 10 consists of at least one shielding component 18 that is secured to the wheel 12 through a fastening system 20.

The schematic showing of the components in FIG. 1 is intended to encompass wheels with different constructions as well as virtually an unlimited number of different forms of the shielding assembly 10, described in one exemplary form below. The schematic representation is intended to encompass the specific form described herein and others involving different components and different cooperating arrangements therebetween. As just one example, the shielding assembly 10 might be maintained on the wheel 12 through the fastening system 20 that engages the rim 14 and/or the tire 16.

Figure 2:
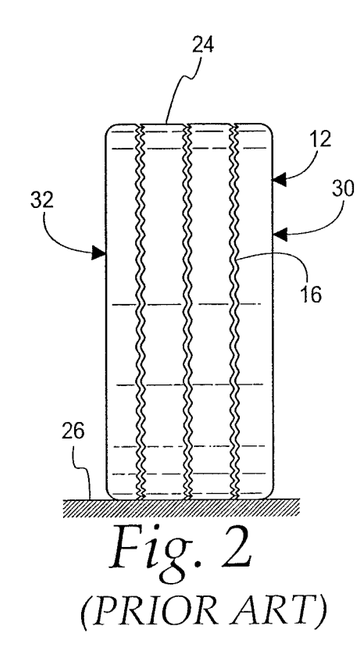
FIG. 2 is a front elevation view of one form of a conventional wheel with which the inventive shielding assembly can be used.
Figure 3:
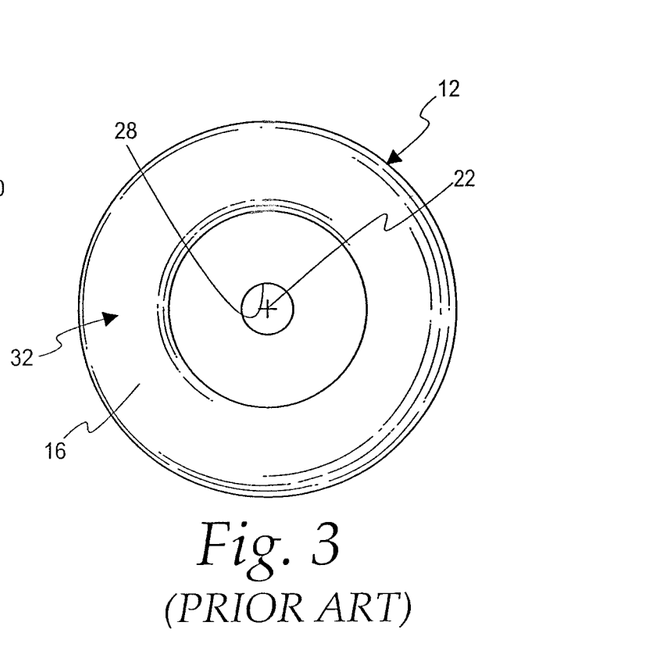
FIG. 3 is a side elevation view of the wheel in FIG. 2.

One specific form of the wheel 12 of FIG. 1 is shown in FIGS. 2 and 3. The wheel 12 has a turning axis 22 and a tire 16 with a treaded, annular, outer surface 24 that rolls against an underlying surface 26. The tire 16 is mounted to a conventional type rim 14, typically with a mounting opening 28 that accommodates a vehicle axle end (not shown).

The wheel 12 has axially oppositely facing sides 30, 32.

Figure 4:
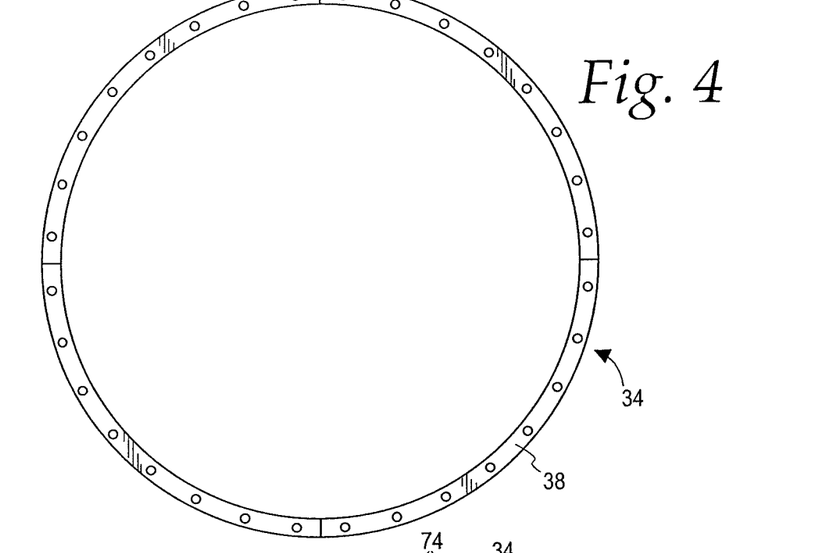
FIG. 4 is a side elevation view of an exemplary mounting assembly used to maintain the inventive shielding assembly on a wheel.
Figure 5:
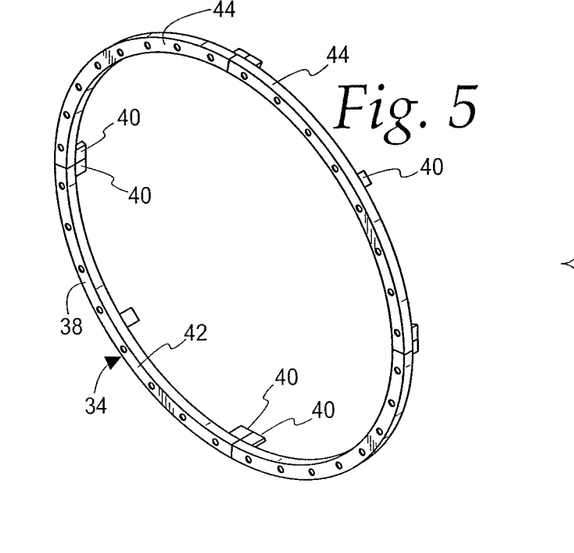
FIG. 5 is a perspective view of the mounting assembly in FIG. 4.
Figure 6:
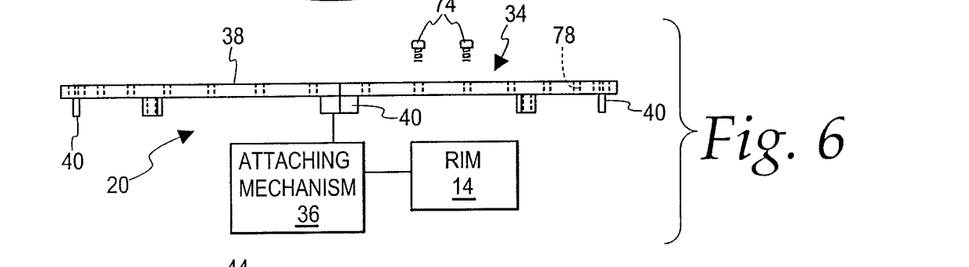
FIG. 6 is a plan view of the mounting assembly in FIGS. 4 and 5.

The fastening system 20 is made up in part of a mounting assembly 34, as shown in FIGS. 4-7, that is attached to the rim 14 through an attaching mechanism 36, shown schematically in FIG. 6.

In this embodiment, the mounting assembly 34 consists of an annular ring 38 with a plurality of circumferentially spaced, axially projecting mounting tabs 40. While the attaching mechanism 36 may take a number of different forms, in one preferred form, the attaching mechanism 36, which may include the tabs 40, is in the form of welds through which the tabs 40 and/or a main annular body 42, making up the mounting assembly 34, can be fixed to the rim 14.

As depicted, the body 42 consists of a plurality of joined, arcuate segments 44 that cooperatively produce the annular shape in FIGS. 4 and 5. The tabs 40 can be connected on adjacent segments 44 to form the ring-shaped body 42 into a unitary, rigid piece. Alternatively, the segments 44 might be individually secured, as by welding, to the rim 14 to move as one piece therewith. Still further, the annular ring 38 may be defined by a single piece. In any event, the mounting assembly 34 is fixed to move as one piece with the rim 14.

Figure 12:
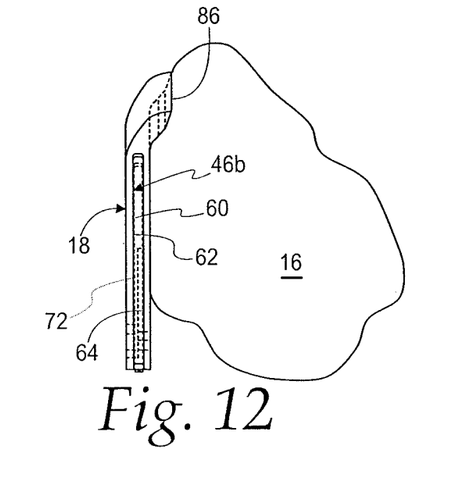
FIG. 12 is a fragmentary, perspective view of a wheel showing one of the shielding components operatively connected thereto.
Figures 13, 14:
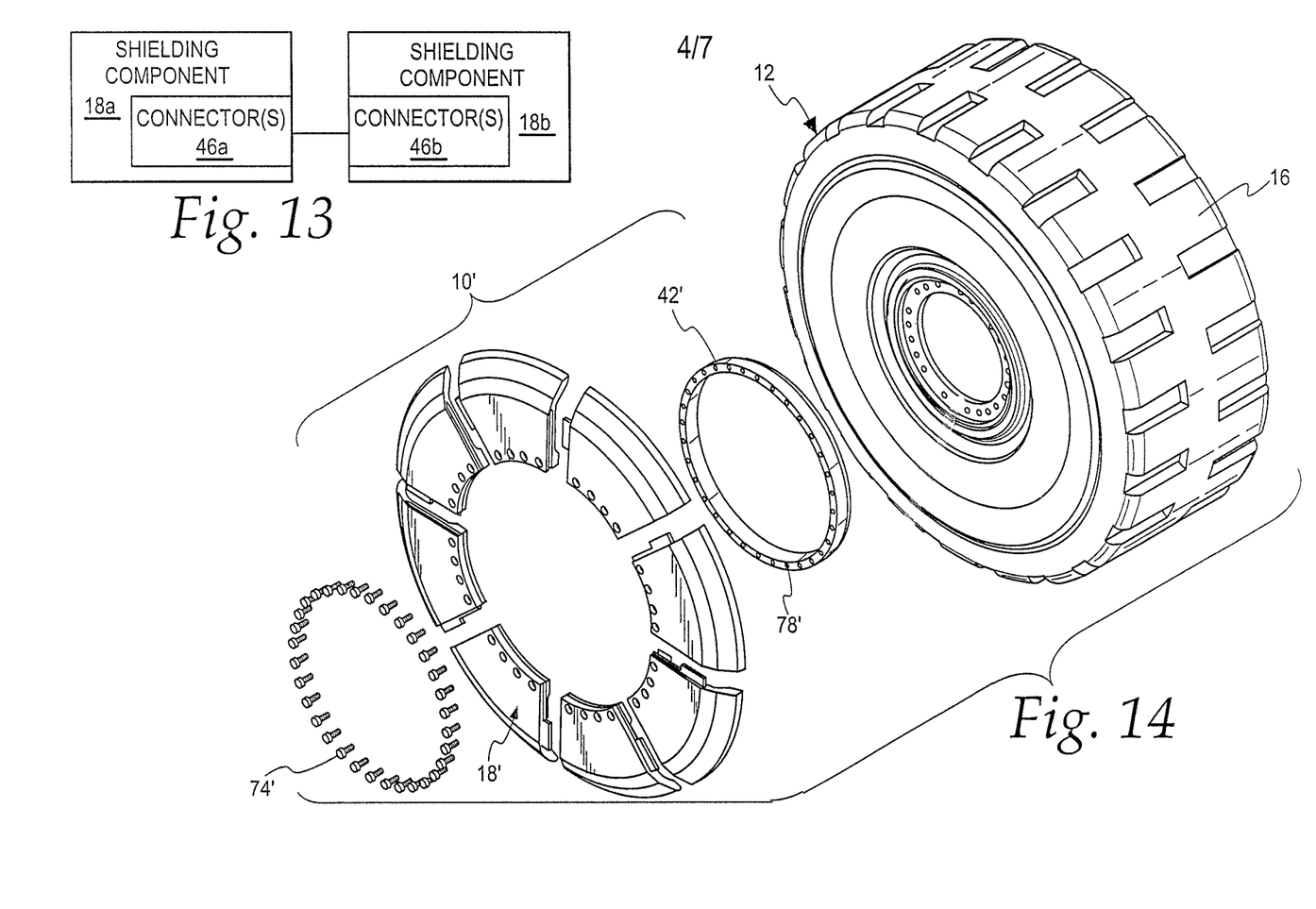
FIG. 13 is a schematic representation of cooperating connectors between operatively connected shielding components as shown in FIGS. 7-12.
FIG. 14 is an exploded perspective view of a conventional wheel with a modified form of shielding assembly, according to the invention.
Figure 15:
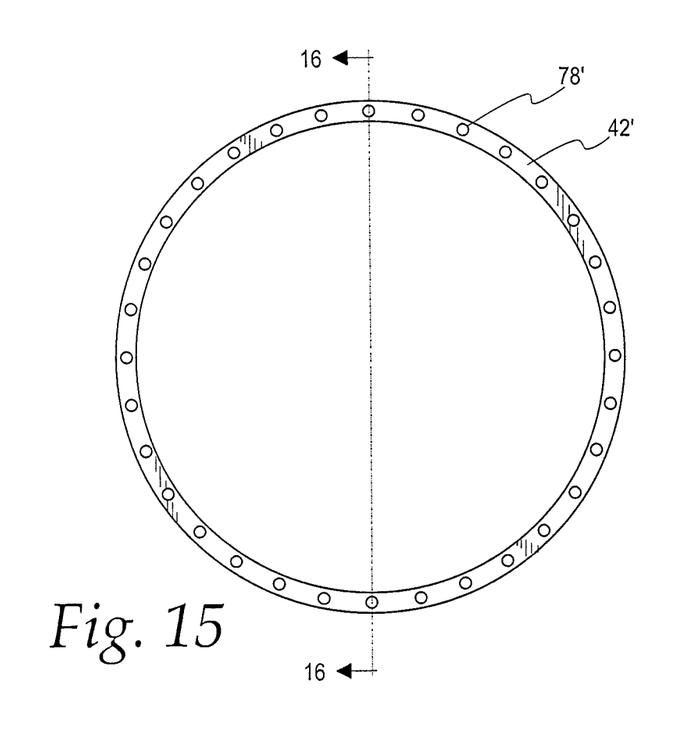
FIG. 15 is an enlarged, front, elevation view of a mounting assembly on the shielding assembly in FIG. 14.

The shielding assembly 10 may be made from a single piece or, as shown in FIGS. 8-12 and schematically in FIG. 13, by combining multiple shielding components 18.

Figure 8:
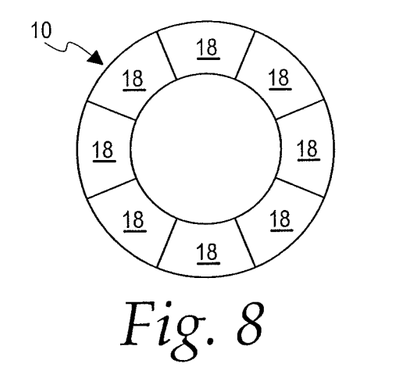
FIG. 8 is a reduced, side elevation view of a shielding assembly, made up of multiple shielding components as shown in FIG. 7.

The schematic showing in FIG. 13 contemplates very different forms of connectors 46a, 46b that cooperate between adjacent shielding components 18a, 18b, that are representative of two adjacent shielding components 18, as shown in FIG. 8, that cooperatively produce an annular shape for the shielding assembly 10.

While the operatively connected shielding components 18 are not limited to the form shown, in the depicted form, each has substantially the same shape—a truncated sector of a circle with radially inner and outer edge portions 48, 50, as viewed along the turning axis 22.

A body 52 of each shielding component 18 is bounded additionally by angled edges 54, 56, each extending between the edge portions 48, 50.

On each shielding component 18, a connector 46*a*, as shown schematically in FIG. 13, is provided at the edge 54, with a connector 46*b* provided at the edge 56.

Figure 9:
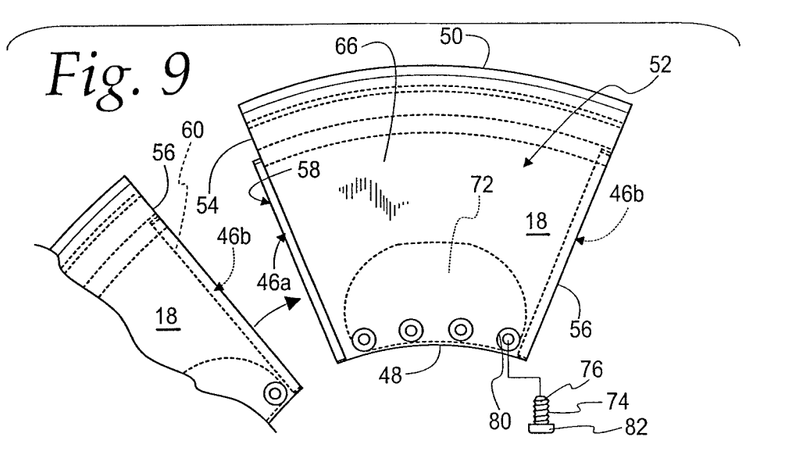
FIG. 9 is a side elevation view showing two shielding components, as in FIGS. 7 and 8, relatively situated preparatory to being operatively connected to each other.
Figure 10:
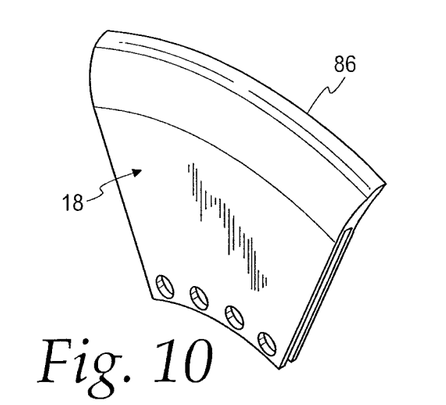
FIG. 10 is a perspective view of one of the shielding components in FIGS. 7-9.
Figure 11:
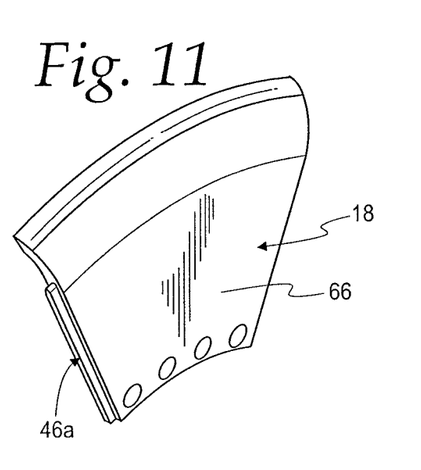
FIG. 11 is a view of the shielding component in FIG. 10 from a different perspective.

Adjacent shielding components 18 are joined as shown particularly in FIG. 9. The shielding components 18 are relatively positioned so that the circumferentially oppositely facing edges 54, 56, on the shielding components 18 to be operatively connected, are adjacent to each other. In this position, the connector 46*a* aligns with the connector 46*b*, which has a complementary shape.

More specifically, the connector 46*a* is in the form of an elongate rib with a radially extending length. The connector 46*b* is in the form of a complementary receptacle bounded in part by axially oppositely facing surfaces 62, 64. With the rib extended into the receptacle, the edges 54, 46 preferably abut or are in close proximity. The cooperating connectors 46*a*, 46*b* maintain a predetermined axial relationship between the shielding components 18, and as depicted a flush relationship between the front surfaces 66 thereof.

Figure 7:
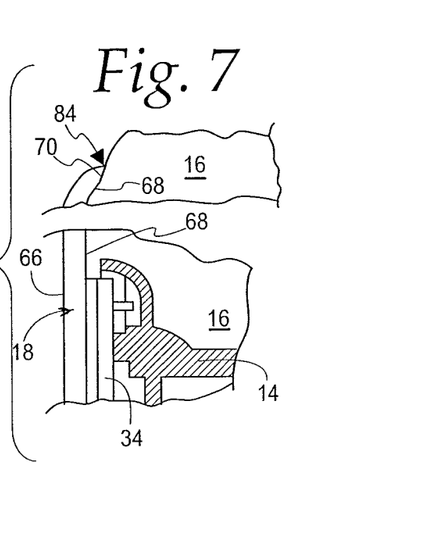
FIG. 7 is a fragmentary, partial cross-sectional view showing the connection of one form of a shielding component, on the inventive shielding assembly, to a wheel rim through the mounting assembly.

The surface 68, facing oppositely to the surface 66, conforms closely, or at least nominally, to a sidewall surface 70 on the tire 16 with the shielding assembly 10 operatively positioned, as shown in FIG. 7.

The bodies 52 of the shielding components 18, in one preferred form, are made from a non-metal material. A most preferred form of non-metal material is urethane, although this is not required. Urethane has the ability to absorb impacts and readily deforms under such impacts without fracturing in even frigid environments. Urethane is also highly resistant to abrasive wear. At the same time, urethane can be used to readily mold the bodies 52 into a desired shape that conforms to the tire 16 at the sidewall region 70.

To rigidify the non-metal body 52, and to facilitate mounting of each shielding component 18, a reinforcing element 72 is embedded in the molded body material, at least at the region near the inner edge portion 48 whereat the shielding components 18 are secured to the mounting assembly 34.

As seen particularly in FIGS. 9 and 12, the reinforcing element 72 has a generally oval shape and extends radially on the order of one-third of the radial extent of the body 52. The reinforcing element 72 spans a majority of the extent of the inner edge portion 48 between the connectors 46*a*, 46*b*. As depicted, each reinforcing element 72 extends substantially fully up to its respective connector 46*a*, 46*b*, but is slightly spaced from the connector 46*a* so as not to weaken the same.

To secure the shielding components 18, a plurality of threaded fasteners 74 are used. Each fastener 74 extends through the material making up the body 52 and the reinforcing element 72. A threaded shank 76 engages within a threaded bore 78 in the body 42 of the mounting assembly 34.

As depicted, for stability and rigidity, multiple fasteners 74 are used to connect each reinforcing element 72 to the mounting assembly 34. As depicted, four such fasteners 74 are accommodated at equally spaced intervals along the edge portion 48.

Seats 80 are formed through the surface 66 of the body 52 to accept each fastener head 82 whereby a countersunk arrangement results and the head 82 is at least nominally flush with the surface 66.

The shielding components 18 are preferably configured so that with the fasteners 74 tightened, the surfaces 68 are drawn against the sidewall surface 70, thereby potentially avoiding the creation of a gap in the region at 84 where the top edge 86 of each body 52 is located. By avoiding such gap formation, buildup of foreign material may be minimized that might progressively wedge the body 52 outwardly from the sidewall surface 70.

The degree of coverage of the sidewall surface 70 may change depending on the desired end objective of the shielding assembly 10. Preferably, the shielding assembly 10 overlies at least that part of the tire 16 that is most vulnerable to being compromised through puncture and/or wear.

In FIGS. 14-21, a modified form of shielding assembly, according to the invention, is shown at 10' on the wheel 12 having the rim 14 upon which the tire 16 is mounted.

The shielding assembly 10' functions substantially in the same way as the shielding assembly 10, described above. The differences between the shielding assemblies 10, 10' will be described below with corresponding parts numbered the same but the latter with a "'" designation.

Figure 16:
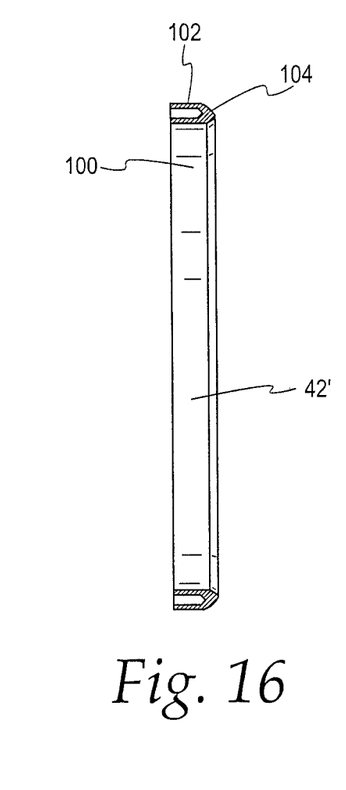
FIG. 16 is a cross-sectional view of the mounting assembly taken along line 16-16 of FIG. 15.
Figure 17:
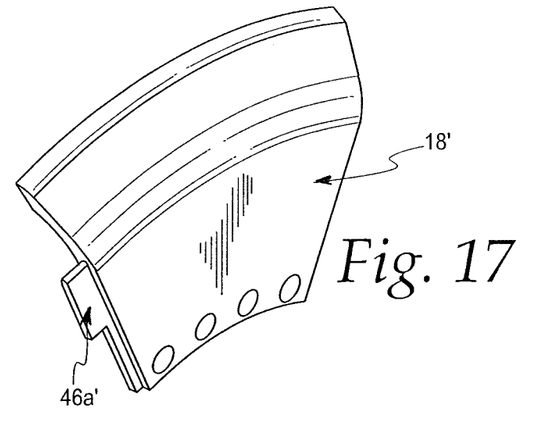
FIGS. 17-20 are different enlarged, perspective views of one of the shielding components making up the shielding assembly in FIG. 14.
Figure 18:
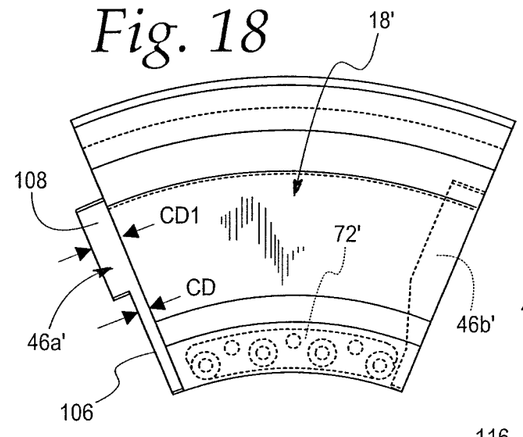
Figure 19:
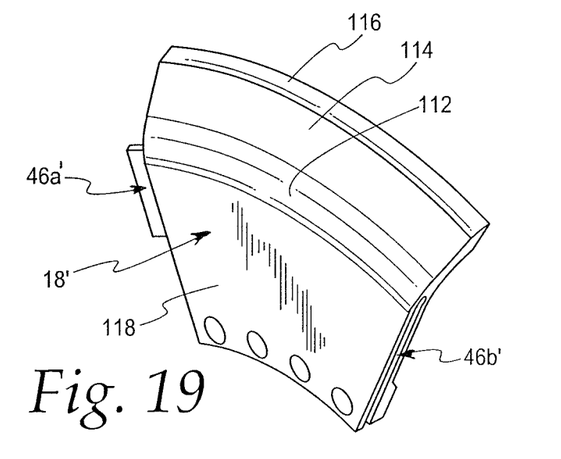

Whereas the mounting assembly 34 depicted has a body 42 made up of a plurality of arcuate segments 44, the body 42' is formed as a single piece that is configured to adapt to a particular rim configuration. More specifically, the body 42' has a diameter and cross-sectional shape that will be complementary to a surface on the hub 14 to facilitate nesting of the body 42' thereagainst and affixing of the same thereto, as by welding. As seen in FIG. 16, the radially inwardly and outwardly facing surfaces 100, 102, respectively, on the body 42', as well as the connecting portion 104, have continuous, uninterrupted shapes around the full circumferential extent of the body 42'.

The shielding components 18' differ from the shielding components 18 by reason of the configuration of the corresponding connectors 46*a*', 46*b*'.

The connector 46*a*' has a generally "L" shape with a rib portion 106 having a projecting circumferential dimension CD approximately equal to the corresponding dimension of the connector 46*a*. Radially outwardly from the rib portion 106, the connector 46*a*' has a widened portion 108 with a circumferential dimension CD1 that is greater than the dimension CD.

With this arrangement, a greater circumferential overlap of the connectors 46*a*', 46*b*' is permitted radially outside of the reinforcing element 72'. This configuration of connectors 46*a*', 46*b*' allows the circumferential extent of the reinforcing element 72' to be greater, thereby potentially contributing to a more rigid and stably mounted structure.

The individual shielding components 18' are secured to the body 42' using fasteners 74' extending through the shielding components 18', including reinforcing elements 72' embedded therein, and into accommodating threaded bores 78' in the body 42'.

The reinforcing element 72' is shown with a lesser radial extent than the corresponding reinforcing element 72 and is also embedded in an axially thickened portion 110 of the shielding component that extends radially inwardly and outwardly slightly beyond the reinforcing element 72'. The thickened portion 110 gives the shielding components 18' greater rigidity and provides a more solid foundation for the embedded reinforcing element 72'.

Further, the exposed surface region of each shielding component 18' has a series, and in this case three, flat segments 112, 114, 116, as viewed from the ends of the shielding component 18'. Each of the segments 112, 114, 116 is angled with respect to the adjacent segment(s) and the flat, axially facing surface 118 on the insert 18'.

Figure 20:
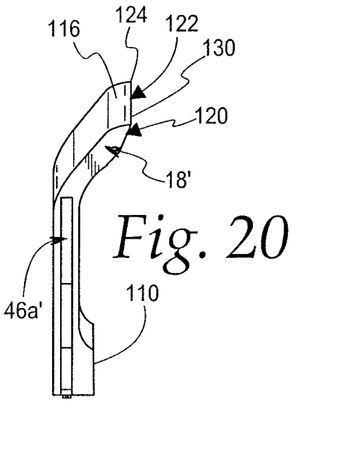
Figure 21:
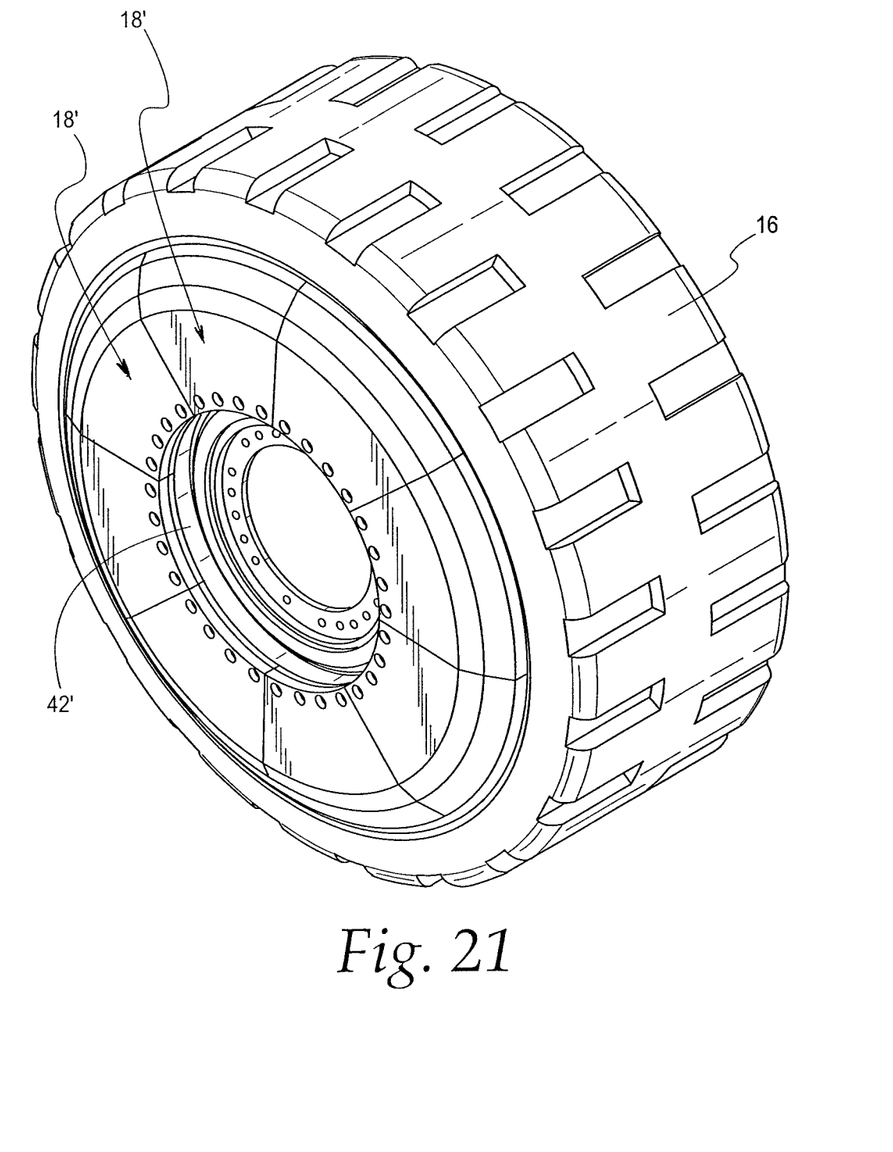
FIG. 21 is a view as in FIG. 14 with the shielding assembly operatively connected to the wheel.

With this construction, and that in the earlier described embodiment, as viewed from the FIG. 20 perspective, a cantilevered finger 120 is formed that is pressed against the side of the tire 16 and is allowed to deflect axially outwardly as the fasteners 74' are tightened. This causes conforming of the contact region at 122 on the finger 120 against the tire 16, thereby to provide a neat appearance and avoid migration of foreign matter between the shielding assembly 10' and the tire 16. In FIG. 20, the contact region can be seen to include a relatively sharp outer edge 124 where the surface segment 116 and a surface segment 130 facing the tire 16 converge.

The foregoing disclosure of specific embodiments is intended to be illustrative of the broad concepts comprehended by the invention.

The invention claimed is:

1. In combination:
   a wheel having a turning axis, a rim and a tire mounted to the rim for rolling against an underlying surface, the wheel having axially oppositely facing sides;
   a mounting assembly that is attached to the rim to move as one piece therewith;
   a plurality of shielding components that are attached to the mounting assembly to overlie at least a part of the tire at one of the axially oppositely facing sides of the wheel,
   wherein at least one of the shielding components is made from a non-metal material and a reinforcing element, wherein the reinforcing element is embedded in the non-metal material; and
   first and second fasteners each extending through and connecting the reinforcing element on each of the at least one shielding component to the mounting assembly, with the first and second fasteners at circumferentially spaced locations.

2. The combination according to claim 1 wherein the at least one shielding component, viewed along the turning axis, is shaped as a truncated sector of a circle with radially inner and outer edge portions and circumferentially oppositely facing first and second edges.

3. The combination according to claim 1 wherein the at least one shielding component has axially oppositely facing surfaces and the reinforcing element is embedded in urethane making up the at least one shielding component so as to reside between the axially oppositely facing surfaces of the at least one shielding component.

4. The combination according to claim 2 wherein the at least one shielding component is made from urethane and the reinforcing element extends radially on the order of one-third a radial extent of the at least one shielding component.

5. The combination according to claim 2 wherein the reinforcing element extends over a majority of an extent of the inner edge portion of the at least one shielding component and is spaced circumferentially from each of the circumferentially oppositely facing first and second edges.

6. The combination according to claim 5 wherein the first and second fasteners each extend through the reinforcing element on the at least one shielding component and into the mounting assembly.

7. The combination according to claim 1 wherein the plurality of shielding components comprise first and second shielding components respectively with circumferentially oppositely facing first and second edges and a receptacle is formed at the first edge into which a part of the second shielding component at the second edge projects with the first and second shielding components operatively connected to each other.

8. The combination according to claim 7 wherein the part of the second shielding component at the second edge is an elongate rib with a radially extending length.

9. In combination:
   a wheel having a turning axis, a rim and a tire mounted to the rim for rolling against an underlying surface, the wheel having axially oppositely facing sides;
   a mounting assembly that is attached to the rim to move as one piece therewith;
   a plurality of shielding components that are attached to the mounting assembly to overlie at least a part of the tire at one of the axially oppositely facing sides of the wheel,
   wherein at least one of the shielding components is made from a non-metal material and a reinforcing element; and
   first and second fasteners each connecting the reinforcing element on the at least one shielding component to the mounting assembly at spaced locations,
   wherein the plurality of shielding components comprise first and second shielding components respectively with circumferentially oppositely facing first and second edges and a receptacle is formed at the first edge into which a part of the second shielding component at the second edge projects with the first and second shielding components operatively connected to each other,
   wherein the part of the second shielding component at the second edge is an elongate rib with a radially extending length,
   wherein the receptacle at the first edge is bounded by axially oppositely facing surfaces.

10. The combination according to claim 1 wherein the at least one shielding component has axially oppositely facing surfaces with one of the axially facing surfaces abutting to an axially facing surface on the tire and the other of the axially oppositely facing surfaces angled axially inwardly up to a radially outer edge of the at least one shielding component.

11. The combination according to claim 1 wherein the first and second fasteners are threaded fasteners directed into threaded bores in the mounting assembly.

12. In combination:
   a wheel having a turning axis, a rim and a tire mounted to the rim for rolling against an underlying surface, the wheel having axially oppositely facing sides;
   a mounting assembly that is attached to the rim to move as one piece therewith;
   a plurality of shielding components that are attached to the mounting assembly to overlie at least a part of the tire at one of the axially oppositely facing sides of the wheel,
   wherein at least one of the shielding components is made from a non-metal material and a reinforcing element; and
   first and second fasteners each connecting the reinforcing element on the at least one shielding component to the mounting assembly at spaced locations,
   wherein the mounting assembly comprises an annular ring with a plurality of axially projecting mounting tabs through which the annular ring is connected to the rim.

13. In combination:
   a wheel having a turning axis, a rim, and a tire mounted to the rim for rolling against an underlying surface, the wheel having axially oppositely facing sides; and a shielding assembly that is attached to the wheel in an operative state to overlie at least a part of the tire at one of the axially oppositely facing sides of the wheel, wherein the shielding assembly comprises a urethane material, wherein the shielding assembly comprises a plurality of shielding components including first and second shielding components respectively with circumferentially oppositely facing first and second edges, wherein a receptacle is formed at the first edge into which a part of the second shielding component at the second edge projects with the first and second shielding components operatively connected to each other, wherein the shielding assembly further comprises at least one reinforcing element, wherein the receptacle and the part of the second shielding component that projects into the receptacle coextend over a radial distance with each other and the at least one reinforcing element.

14. The combination according to claim 13 wherein the at least one reinforcing element is embedded in the urethane material.

15. The combination according to claim 14 wherein a plurality of threaded fasteners extend at circumferentially spaced locations through each of the at least one reinforcing element to maintain the shielding assembly in the operative state.

16. The combination according to claim 13 wherein the part of the second shielding component at the second edge is an elongate rib with a radially extending length.

17. In combination:
a wheel having a turning axis, a rim, and a tire mounted to the rim for rolling against an underlying surface, the wheel having axially oppositely facing sides; and
a shielding assembly that is attached to the wheel in an operative state to overlie at least a part of the tire at one of the axially oppositely facing sides of the wheel,
wherein the shielding assembly comprises a urethane material,
wherein the shielding assembly comprises a plurality of shielding components including first and second shielding components respectively with circumferentially oppositely facing first and second edges,
wherein a receptacle is formed at the first edge into which a part of the second shielding component at the second edge projects with the first and second shielding components operatively connected to each other,
wherein the part of the second shielding component at the second edge is an elongate rib with a radially extending length,
wherein the receptacle at the first edge is bounded by axially oppositely facing surfaces.

18. In combination:
a wheel having a turning axis, a rim, and a tire mounted to the rim for rolling against an underlying surface,
the wheel having axially oppositely facing sides;
a shielding assembly that is attached to the wheel to overlie at least a part of the tire at one of the axially oppositely facing sides of the wheel and comprising first and second shielding components respectively with circumferentially oppositely facing first and second edges,
wherein a receptacle is formed at the first edge into which a part of the second shielding component at the second edge projects with the first and second shielding components operatively connected to each other,
wherein with the part of the second shielding component projected into the receptacle, the part of the second shielding component resides between axially oppositely facing surfaces on the first shielding component.

19. A shielding assembly as recited in claim 13.

20. A shielding component as recited in claim 1.

21. The combination according to claim 1 wherein the at least one shielding component has a radially outer edge and axially oppositely facing surface segments adjacent the radially outer edge that converge in a radially outward direction to the radial outer edge.

* * * * *